United States Patent [19]
Clark, Jr. et al.

[11] Patent Number: 5,823,430
[45] Date of Patent: Oct. 20, 1998

[54] AUTOMATIC FERTILIZING APPARATUS

[76] Inventors: George Donald Clark, Jr., 3161 Dunhill Dr., Cocoa, Fla. 32926; Robert W. Knuutila, II, 2191 Rockledge Dr., Rockledge, Fla. 32955

[21] Appl. No.: 782,530

[22] Filed: Jan. 10, 1997

[51] Int. Cl.⁶ .................................................. A62C 5/02
[52] U.S. Cl. ............................ 239/10; 239/317; 137/216
[58] Field of Search ........................... 239/10, 201, 310, 239/317, 318, 419, 365, 596, 601; 137/216, 268; 169/15; 47/48.5, 1.01

[56] References Cited

U.S. PATENT DOCUMENTS

| | | | |
|---|---|---|---|
| D. 322,838 | 12/1991 | Hagedorn | D23/225 |
| 2,599,678 | 6/1952 | Walker | 239/310 |
| 3,194,444 | 7/1965 | Hubert | 239/317 X |
| 3,807,434 | 4/1974 | Rasmussen et al. | 239/365 X |
| 4,901,923 | 2/1990 | McRoskey | 239/123 |
| 5,020,689 | 6/1991 | Eitner, Jr. et al. | 169/15 X |
| 5,029,612 | 7/1991 | Simbulan | 137/216 X |
| 5,085,278 | 2/1992 | Keltner | 169/15 |
| 5,150,840 | 9/1992 | Grynkiewicz | 239/305 |
| 5,188,294 | 2/1993 | Sealy | 239/310 |
| 5,246,168 | 9/1993 | Williams | 239/313 |
| 5,303,729 | 4/1994 | DeMarco | 137/268 |
| 5,353,990 | 10/1994 | Williams | 239/313 |
| 5,364,030 | 11/1994 | Murdock et al. | 239/310 |
| 5,366,159 | 11/1994 | Childers | 239/310 |
| 5,375,769 | 12/1994 | Schultz | 239/310 |
| 5,413,280 | 5/1995 | Taylor | 239/10 |
| 5,507,945 | 4/1996 | Hansen | 210/198.1 |
| 5,544,810 | 8/1996 | Horvath | 239/10 |

FOREIGN PATENT DOCUMENTS 1375881  9/1963  France .................................. 239/317

*Primary Examiner*—Andres Kashnikow
*Assistant Examiner*—Steven J. Ganey
*Attorney, Agent, or Firm*—Brian S. Steinberger; Law Offices of Brian S. Steinberger

[57] ABSTRACT

An automatic fertilizer system apparatus having a liquid fertilizer dispenser for introducing the continuous addition of a selected amount of fertilizer, insecticide, herbicide type chemicals to sprinklers that use an outside waterline. The dispenser having an adjustable metering cap with different diameter through-holes for allowing the contents of the dispenser to be injected into the flowing stream of water which leads to the sprinklers in a selected precise manner. The system splits incoming water into the dispenser, and underneath the dispenser where an orifice having a inwardly facing bevelled through-hole along with the metering cap forms a point of lowest pressure region where the chemicals are injected into an output fluid flow to sprinkler heads in amounts selected and dependent upon by the different sized metering caps.

14 Claims, 7 Drawing Sheets

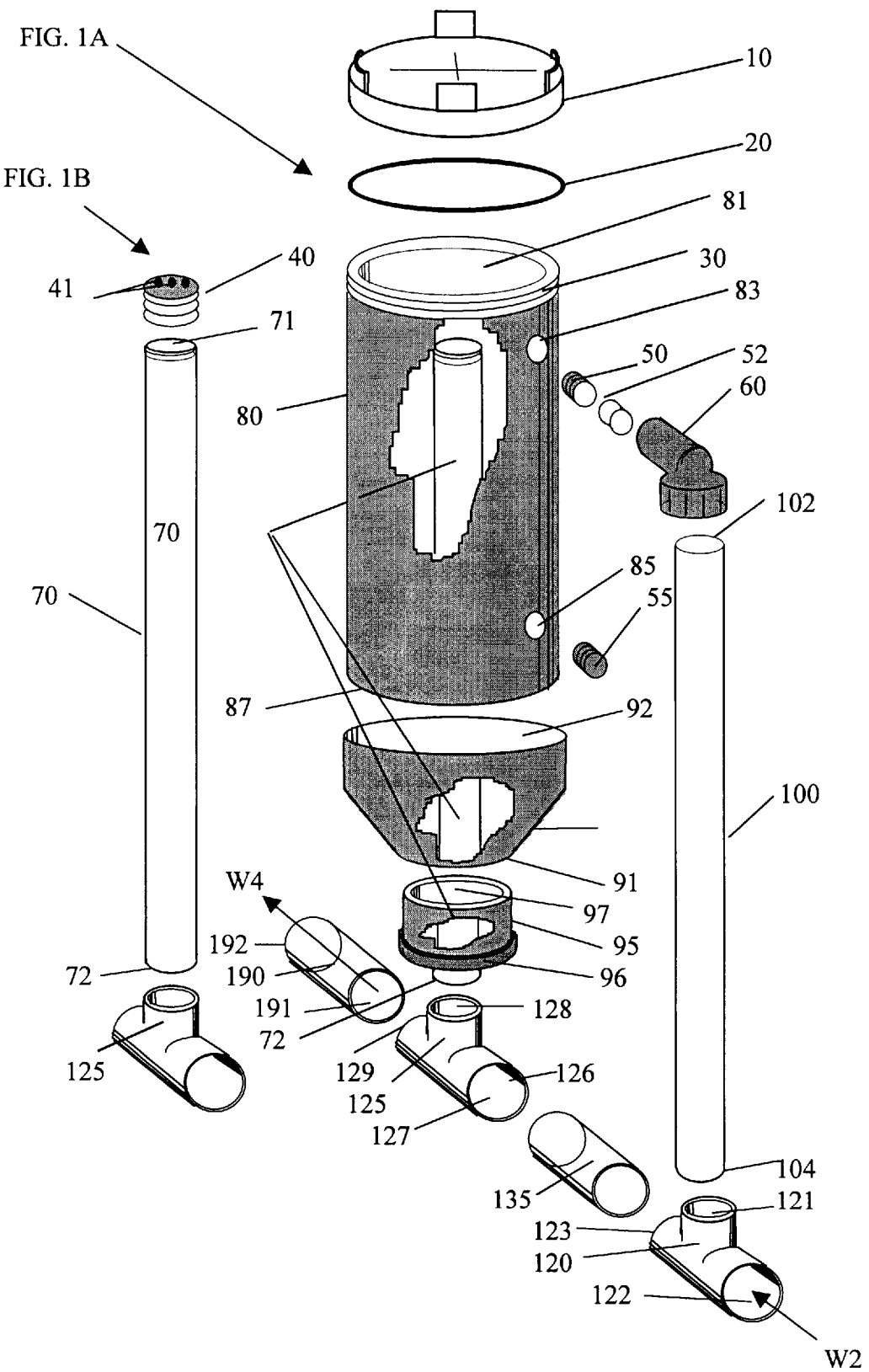

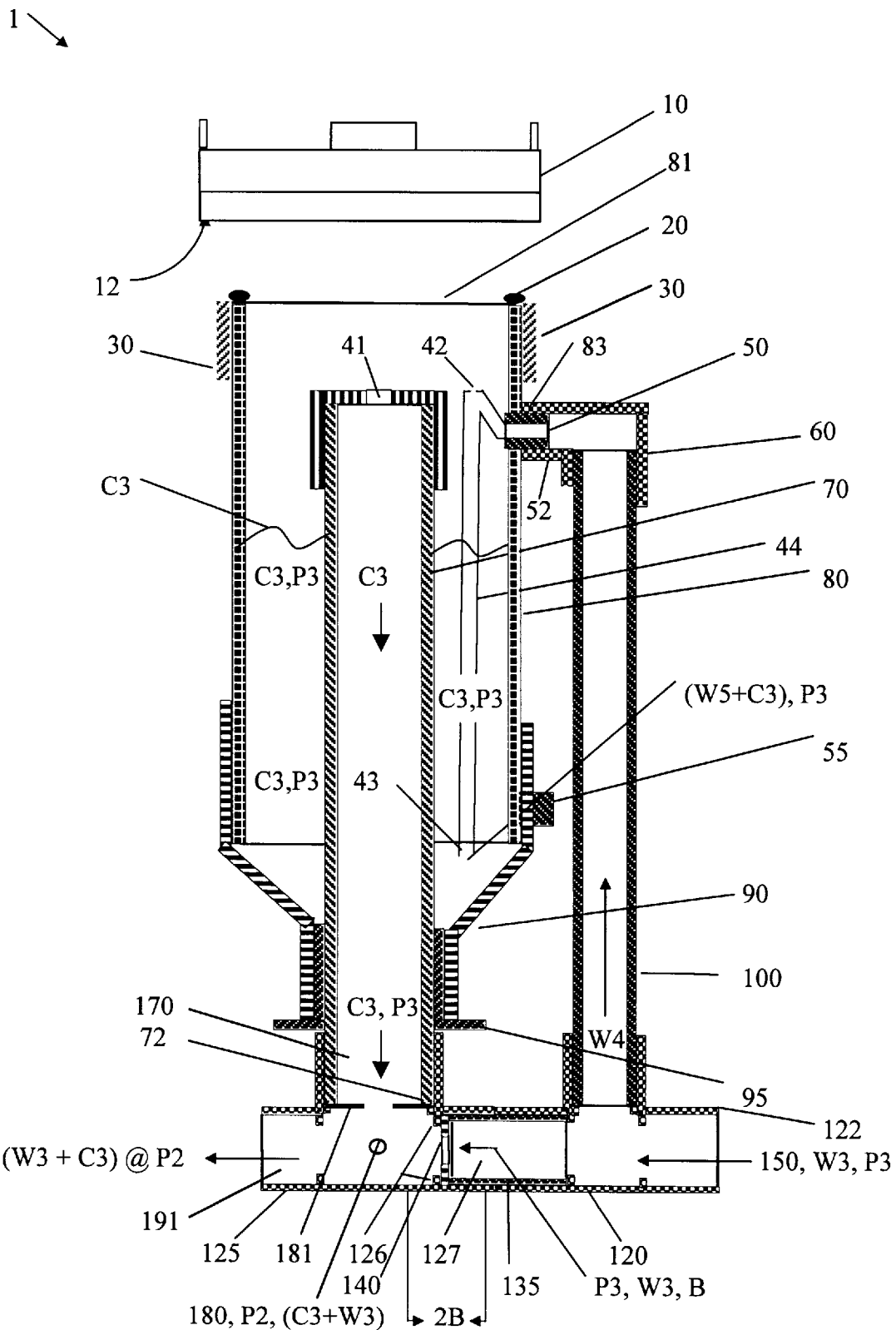

AUTOMATIC FERTILIZING APPARATUS

This invention relates to an automatic fertilizing feeding apparatus, and in particular to an apparatus with continuous control of introducing a precise quantity of chemicals such as fertilizer, insecticide, herbicide and the like into a stream of liquid that flows through to an existing sprinkler system.

BACKGROUND AND PRIOR ART

Underground and above ground sprinkler systems for lawns, shrubbery, plants and the like, generally include a source of water such as a city water supply that connects to a garden hose or PVC piping and eventually to dispersing sprinkler heads. Typically, additives such as fertilizer, insecticide, and herbicide have been added before or after the sprinkler system has been turned on, or has been dispensed by use of separate spreaders. Attempts have been made to combine the additives with the water sources in some lawn sprinkler system by mixing the chemicals with the sprinkler water systems. See U.S. Pat. Nos. Des.322,838 to Hagedorn; 4,901,923 to McRoskey et al.; 5,150,840 to Grynkiewicz; 5,188,294 to Sealy et al.; 5,246,168 to Williams; 5,303,729 to DeMarco; 5,353,990 to Williams; 5,366,159 to Childers; 5,375,769 to Schultz; 5,413,280 to Taylor; 5,507,945 to Hansen; and 5,544,810 to Horvath, Jr. et al.

However, none of the prior art attempts to use the orifice principle to adequately and continuously mix the chemical additives with the sprinkler system water supply. The orifice plate, flow nozzle, and venturi, and the like are all engineering principles that produce pressure drops proportional to the square of the flow rate, according to the Bernoulli equation. However, selecting a flow meter type depends on factors such as cost, accuracy, and ease of installation and maintenance. None of the prior art attempts have made a choice of a flow metering device which is influenced by the required accuracy and range, cost, complication, ease of production as is done by the orifice principle. The currently available devices are complex, expensive and difficult to use.

Other deficiencies of the prior art devices are that they do not provide a convenient method for determining the quantity of additives to be used for a given area.

SUMMARY OF THE INVENTION

The first objective of the present invention is to provide a dispensing device which utilizes the orifice principle to cause liquid such as fertilizer, insecticide, herbicide and the like, to be dispensed from a container into a flowing stream.

The second object of this invention is to provide a dispensing device which utilizes the pressure of a flowing stream to assist in injecting a selected amount of liquid such as fertilizer, insecticide, herbicide and the like, through a metering cap into a flowing stream.

The third objective of this invention is to provide a dispensing device with a built-in backflow prevention that is effective when pressure is lost and will not allow the chemicals to flow back into the water source.

The fourth objective of this invention is to provide a dispensing device which is compact, simple in construction and assembly and economical to produce.

The subject invention supplies the need for a fluid dispensing device which is of extremely simplified and of durable construction that would eliminate malfunction problems, and permit the introduction of additives to a stream of fluid in dependable precise quantities. Thus, the orifice is the simplest and least costly device that gives desired accuracy for a marketable purchase price.

Further objects and advantages of this invention will be apparent from the following detailed description of a presently preferred embodiment which is illustrated schematically in the accompanying drawings.

BRIEF DESCRIPTION OF THE FIGURES

FIG. 1A is a break-away perspective view of a first preferred embodiment of the automatic fertilizer invention.

FIG. 1B shows the backflow preventer pipe used in the automatic fertilizer embodiment of FIG. 1.

FIG. 2A is a cross-sectional view of the first preferred automatic fertilizer embodiment of FIG. 1.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 2B:
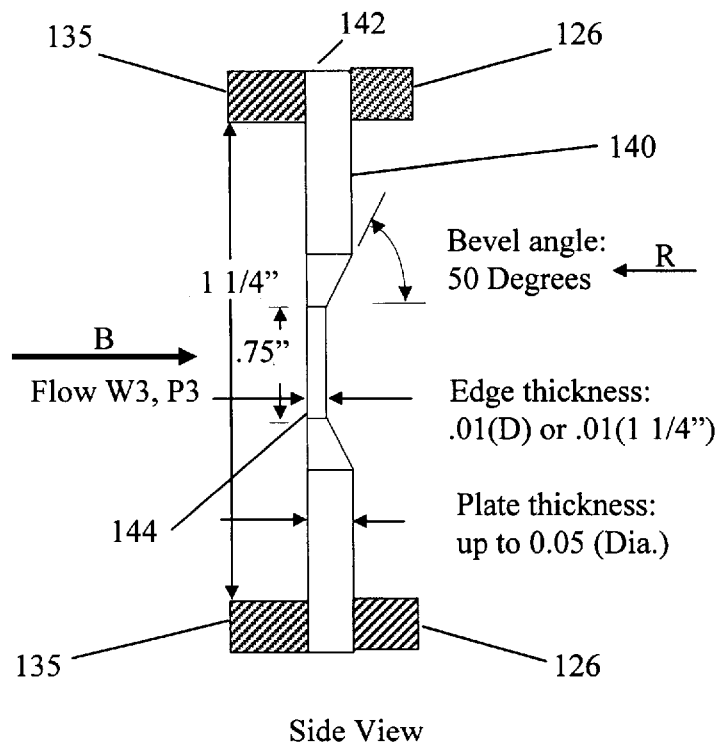
FIG. 2B is an enlarged view of the orifice used in the embodiment of FIG. 2A, in a reverse orientation.
Figure 2C:
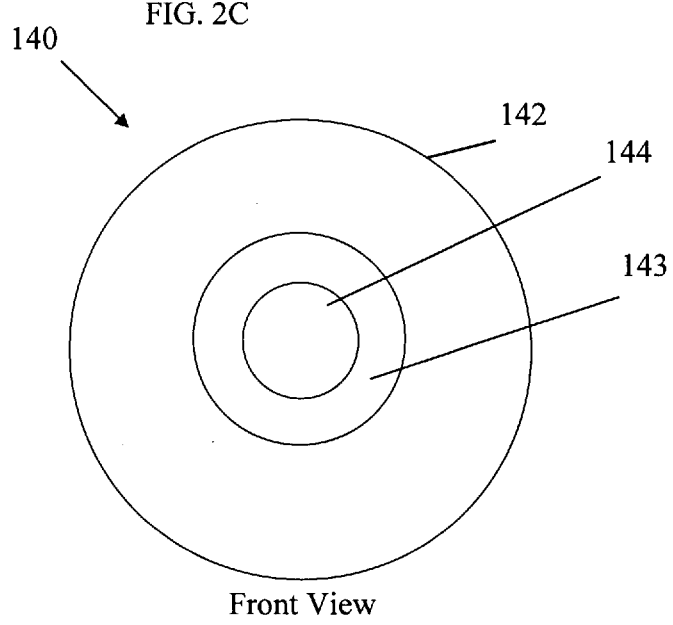
FIG. 2C is an end view of the orifice of FIG. 2B along arrow R.

FIG. 1A is a break-away perspective view of the first preferred embodiment 1 of the automatic fertilizer invention. FIG. 1B is a view of the pipe 70 used in the automatic fertilizer embodiment 1 of FIG. 1. FIG. 2A is a cross-sectional view of the first preferred automatic fertilizer embodiment 1 of FIG. 1. FIG. 2B is an enlarged side view of the orifice 140 used in the embodiment of FIG. 2A in a reverse orientation. FIG. 2C is a front view of the orifice 140 of FIG. 2B along arrow R.

Referring to FIGS. 1A, 1B, 2A, 2B, and 2C, embodiment 1 includes a screwable cap-cover 10, with interior threads 12 that mates to exterior threads 30 to close the top opening 81 of large main cylinder body 80. An rubber type O-ring 20 aids in sealing the cap-cover 10 to main cylinder body 80. A lower side opening 85 can be used in the second embodiment described in greater detail in reference to FIG. 3, but for the first embodiment can be plugged by screwable plug-stopper 55.

Referring to FIGS. 1A, 1B, 2A, 2B, 2C, upper side opening 83 connects by a PVC nipple connector 50 with exterior surface threads that connects to interior threaded spigot 52, that slip connects to a ninety degree elbow fitting 60, the latter of which slips or thread connects to the exterior threads 102 of a vertical pipe 100. The opposite end of connector 50 attaches to a hose line 44 which feeds into main cylinder body 80 with an output end 43 near funnel bottom 90. Small hole 42 at top of line 44 prevents backflow when incoming pressure, P1, drops. A first tee fitting 120 has a slip or threaded top opening 121 which mates to interior end threads 104 of pipe 100. Water flows from a city water source connection (shown in FIG. 5) in the direction of arrow W1 into the opening 122 of tee fitting 120, which has an opposite opening 123 thread or slip mateable to pipe 135. A second tee fitting 125 has a side opening 127 with an interior ridge/flange 126 which buts up against one side of a stainless steel orifice 140 and is held in place by being threaded or slipped on the opposite side pipe 135. Referring to FIGS. 2B and 2C, orifice 140 can be washer shaped with an outer diameter, D, of approximately 1 & ¼(1.25) inches, a circular exterior surface 142 and a co-axial center hole 144 with ninety degree sharp angled edge 145 having a diameter of approximately ¾(0.75) of an inch, which is concentric with pipe opening 127, and pipe 135. Through-hole center 144 has an approximately 50 degree angled bevelled edge 143, where the inner edge thickness is approximately 0.01× 1.25, or 0.0125 inches, where the plate thickness of the orifice itself is 0.05×1.25, or 0.625 inches. Note that bevelled side 143 is on the side opposite to the incoming water flow W3. Water flowing into tee 120 splits to travel up vertical pipe 100 and to second tee coupling 125. Water flowing up pipe 100 passes into main cylinder 80 at side opening 83 and then down hose line 44 exiting at output 43, thus causing Chemicals, C, stored inside main body 80 to rise and pass into through-hole 41 of cap 40 which will later be described greater detail.

Referring to FIGS. 1A, 1B, 2A and 2B, tee coupling 125 has an upper opening 128 that threads or slip connects to the bottom portion 72 of pipe 70. The bushing 95 has a lower opening 96 through which pipe 70 slips through butting bushing 95 against the tee 125 and an upper end 97 which thread/slip connects to the narrow bottom end 91 of a funnel shaped reducer fitting 90. All connections can be sealed by PVC glue, contact cement, and the like. Upper opening 92 likewise connects to the bottom 87 of large main cylinder body 80 in a similar manner. Inside main cylinder body 80 is a vertical pipe 70 which has an upper opening 71, which is partially closed by a PVC cap 40 having through-holes 41 therethrough, which will be described in greater detail in reference to FIG. 6. Another pipe 190 has one threaded side opening 191 which connects to mateable threaded opening 129 of tee coupler 125. Arrow W4 indicates the flow of fluid to sprinkler systems shown more clearly in reference to FIG. 4. Components 10, 40, 50, 55, 60, 70, 80, 90, 100, 120, 125, 135, 190 can be formed from materials such as but not limited to PVC, plastic, fiberglass, and the like. The second embodiment 200 of FIG. 3 will be described after FIGS. 4–6, and 7A–7D are discussed.

Figure 4:
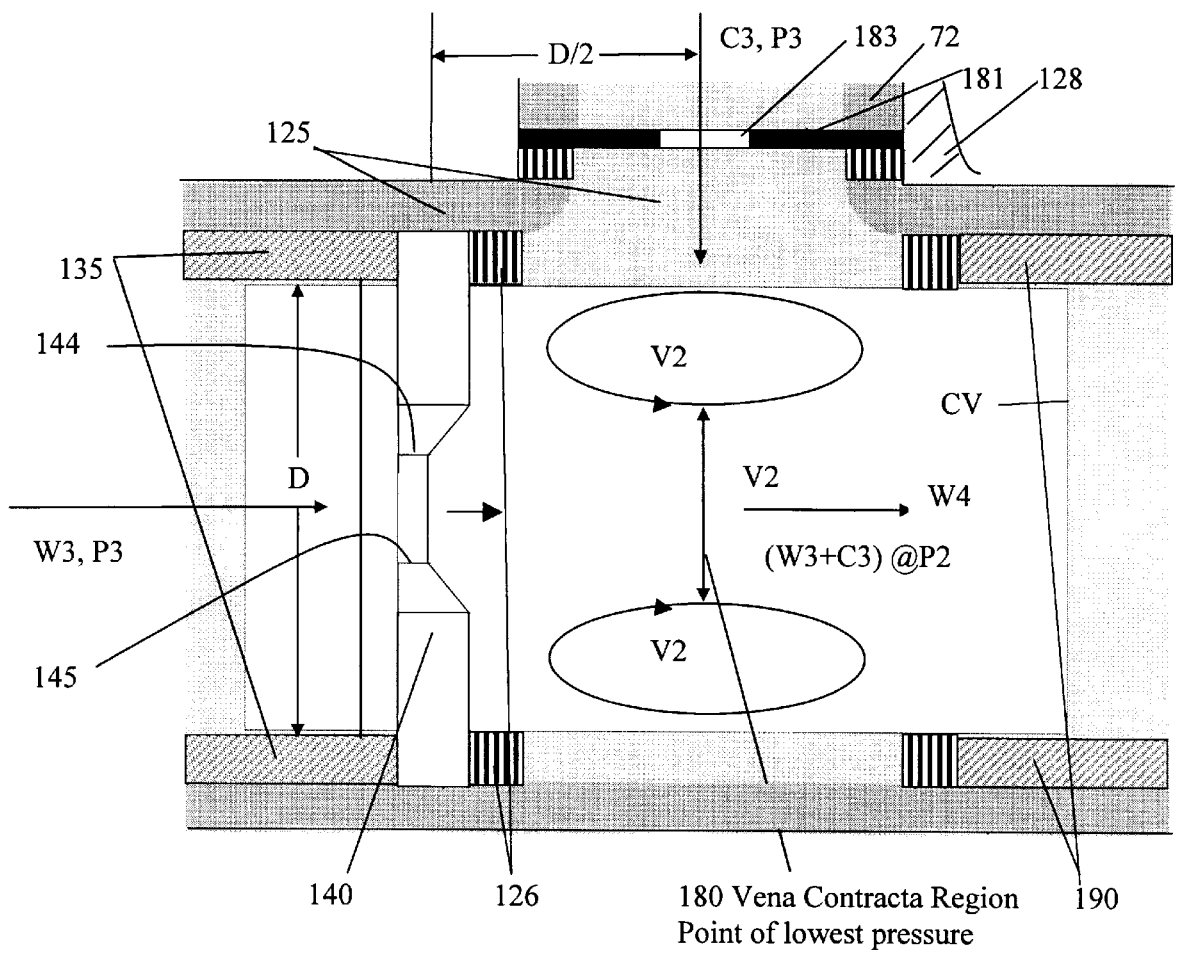
FIG. 4 is a side view of the fluid flow stream lines that cross the orifice.

Referring to FIG. 4, the thin plate orifice 140 functions as an obstruction meter and creates a pressure differential(P3-P2) across the orifice inside the control volume(CV) area. A stainless steel washer 181 having a through-hole opening 183 is placed between an interior flange 184 in the upper opening of tee splitter 125 and held in place by the bottom 72 of pipe 70. Through-hole opening 183 directs and positions the chemical flow C3 to be directed toward the vena contracta region 180. Orifice 140 causes circular flowing fluid stream lines V1 around region 180 which is a short distance downstream from the orifice plate 140. Region 180 is the smallest flow cross section area called the vena contracta region, which corresponds to the point of lowest pressure P2. Orifice 140 has sharp angled edge 145 at opening 144 which increases the fluid velocity passing into the region within tee coupling 125. Water flowing in the direction of W3 creates circular stream lines flowing in the direction of V1. The area along arrow V2 which is within the circular stream V1 becomes the lowest point of pressure, 180(vena contracta region). Chemical fluid C3, coming down bottom end pipe 72 is injected and drawn into low pressure area V2, where water W3 and chemical C3 are mixed together, the latter of which moves in the direction of W4 through pipe 190. The vena contract region 180 occurs at a distance from the orifice 140 which is equivalent to approximately one-half the Diameter of the Orifice 140. The pressure differential at this point (P2, 180) causes the fluid at a higher pressure P3 in the main cylinder body 80 to flow through the metering cap 40 into the fluid stream W3. This operation enables the upstream flow C3 to be controlled from inside the main cylinder body 80 by the metering cap 40. The volumetric flow upstream C3 is controlled by the size of the holes 41 in cap 40(shown more clearly in FIG. 1B, 2A) which is screwed onto back flow pipe 70. The cap 40 is shown in greater detail in reference to FIG. 6.

Figure 5:
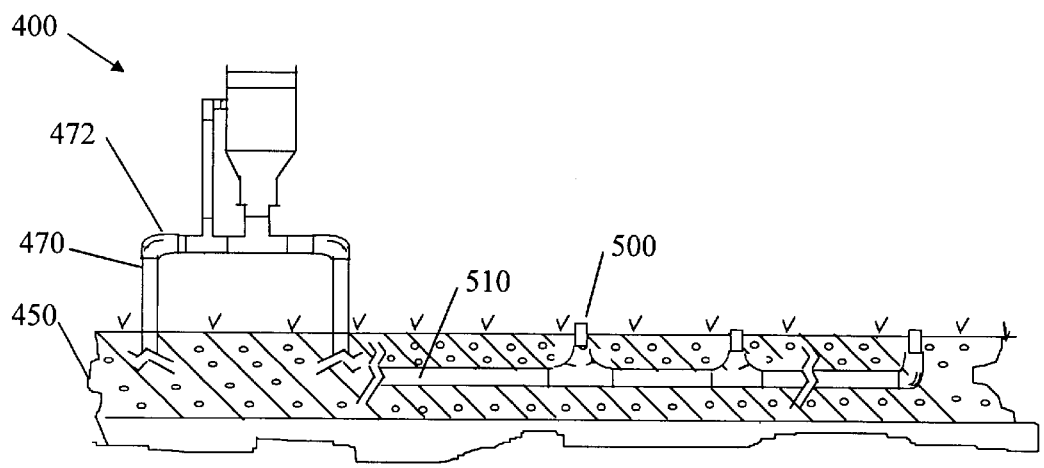
FIG. 5 is a perspective view of the automatic fertilizer embodiment with sprinkler connections.
Figure 6:
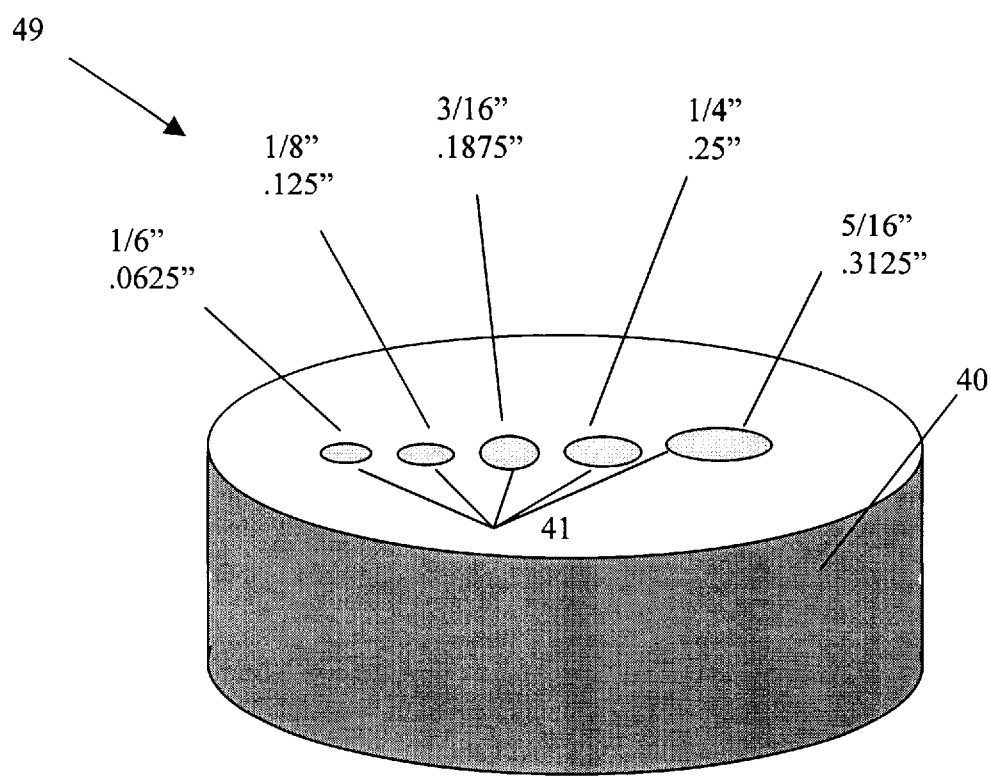
FIG. 6 is a perspective view of a metering cap used in the first and second embodiments.

Referring to FIG. 6, metering cap 40 includes five size through-holes of ¹⁄₁₆", ⅛", ³⁄₁₆", ¼", and ⁵⁄₁₆". These holes 41 each control the precise amount of chemicals C3 to be fed into the downstream vena contract region 180. The mixed fluid W3 and C3 at the vena contracta region 180 then diverges back to the full pipe diameter and on to the sprinkler heads 500 shown in FIG. 5. FIG. 5 is a perspective view 400 of the automatic fertilizer embodiment 1(FIG. 2A), 200(FIG. 3) attached at one end to a conventional PVC input line pipe 470 with a turn on/off ball valve 472, which connects to a city water supply 450 and at the other end to an underground sprinkler line 510 that connects to conventional sprinkler heads 500, which were described in the background section of this invention. During use, only one of the through-holes 41 is to be used. All the other through-holes can be plugged with a stopper 49 such as cork and the like. Alternatively, a user can have several caps 40, each one having a single differently sized through-hole 41 therein. For example, one cap 40 can have a single ¹⁄₁₆" through-hole 41 therethrough. A second cap 40 can have a single ⅛" through-hole therethrough. A third cap 40 can have a single ³⁄₁₆" through-hole 41 therethrough. A fourth cap 40 can having a single ¼" through-hole 41 therethrough. A fifth cap 40 can have a single ⁵⁄₁₆" through-hole 41 therethrough, and so forth. The use of the caps will be described in reference to FIGS. 7A–7D.

Figure 7A:
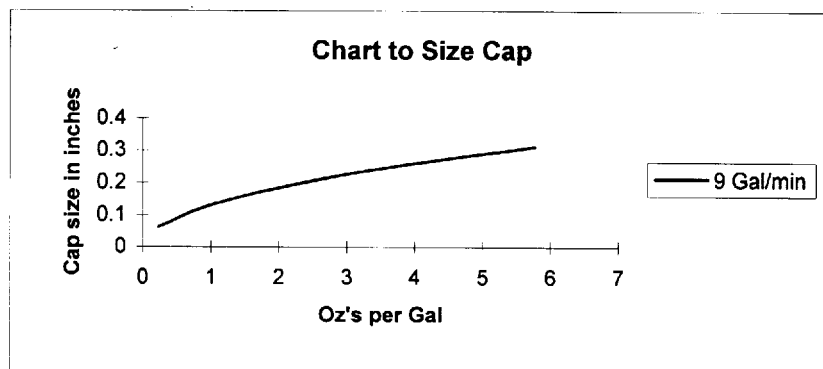
FIG. 7A is a graph of the through-hole sizes in the metering cap versus amount of chemicals needed to be mixed for a sprinkler system having a combined output flow at the sprinkler heads of nine(9) gallons per minute.
Figure 7B:
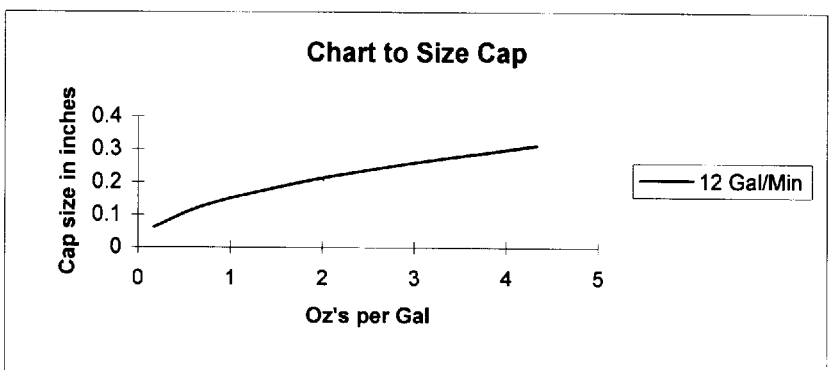
FIG. 7B is a graph of the through-hole sizes in the metering cap versus amount of chemicals needed to be mixed for a sprinkler system having a combined output flow at the sprinkler heads of twelve(12) gallons per minute.
Figure 7C:
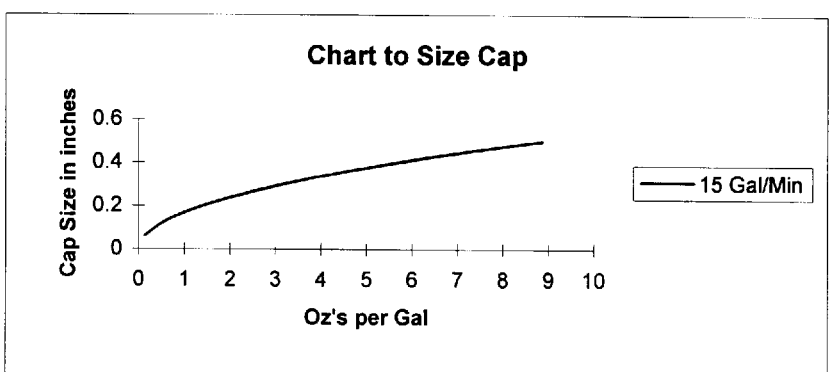
FIG. 7C is a graph of the through-hole sizes in the metering cap versus amount of chemicals needed to be mixed for a sprinkler system having a combined output flow at the sprinkler heads of fifteen(15) gallons per minute.
Figure 7D:
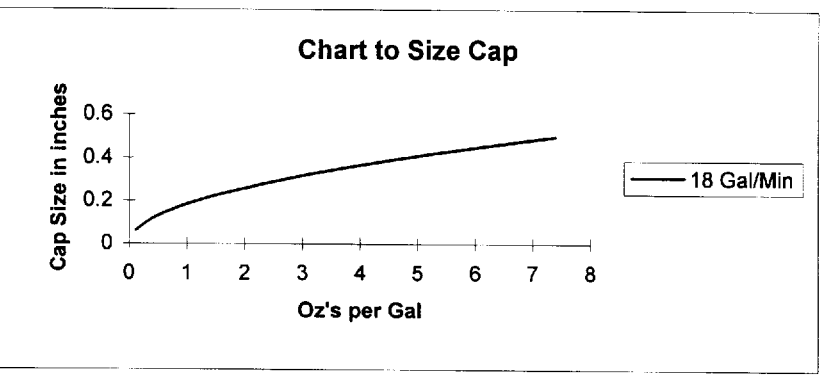
FIG. 7D is a graph of the through-hole sizes in the metering cap versus amount of chemicals needed to be mixed for a sprinkler system having a combined output flow at the sprinkler heads of eighteen(18) gallons per minute.

FIG. 7A is a graph of the through-hole diameter sizes 41 in the metering cap 40 versus amount of chemicals needed to be mixed for a sprinkler system having a combined output flow at the sprinkler heads of nine(9) gallons per minute. Referring to FIGS. 4, 5, 6 and 7A, a sprinkler system 510 can have multiple sprinkler heads whose combined output is nine(9) gallons per minute. Chemicals, C, such as fertilizer, insecticide and the like, have operating instructions and labels which specify and recommend a desired mixture of a certain number of ounces(oz.) that should be used with every gallon of water. For example, a chemical additive could specify a lawn application of adding four(4) ounces of chemicals per gallon of water in use. If the sprinkler system 510 in use has a combined total output flow at all of its sprinkler heads 500 of 9 gallons per minute, the embodiment 1 needs a cap 40 having a through-hole diameter 41 of 0.25 inches or ¼". The vena contract region 180 allows for the exact mixture of desired ounces per gallon to be achieved using various sized through-holes 41 in cap 40. If the sprinkler system has more heads where the combined output of gallons is greater, then the through-hole diameter sizes 41 in the metering cap 40 change as shown by FIGS. 7B–7D.

Common applications of using chemicals with water in sprinkler systems have manuals and instructions for telling consumers the proper amount of ounces of chemical liquid per gallon of water. This ounces per gallon is a selected flow rate value, and is indicated as W4 in FIG. 4. The common equation for Flow rate, Q, according to Fox & McDonald, Fluid Mechanics, John Wilely & Sons, 3rd Edition, 1985, pages 197–201, follows as equation (1).

$$Q = C_d V \pi R^2 \tag{1}$$

In the subject invention Q would be equivalent to the chemical liquid, C3, being injected and drawn into the point of lowest pressure 180(FIG. 4). $C_d$ is the discharge coefficient. Crane's Handbook on Flow of Fluids, Tech. Paper 410, 1988, page A20, gives a $C_d$ value for sharp edge through-hole orifices of 0.65. This value would be equivalent to the sharp edged through-hole orifice 140(FIG. 4) used in the subject invention. R is the radius of the through-hole opening 41 in the metering cap 40. V is velocity and in the subject invention would be the velocity of the fluid passing through the dispenser 1 of FIG. 1.

According to Fox & McDonald, Fluid Mechanics, John Wilely & Sons, 3rd Edition, 1985, pages 197–201, the Bernoulli theorem is a means of expressing the application of the law of conservation of energy to the flow of fluids in a conduit. The total energy at any particular point, above some arbitrary horizontal datum plane, is equal to the sum of the elevation head, the pressure head, and the velocity head, with no change in the Z axis as the following equation (2) for velocity.

$$V^2/2g = H, \tag{2}$$

For calculating velocity, V from equation (2), V=the square root of (2g×H), where g is the gravitational constant 32.2 ft/s² or 386.4 in/s². H refers to the pressure head (sometimes referred to as head loss in inches of fluid). In the subject invention, H is the pressure loss on both sides of orifice 140(FIG. 4). Pressure was measured using a pressure gage in pounds per square inch(psi) approximately one inch to the left-side and approximately one inch to the right-side of the Orifice 140. A pressure gage useful for measuring pressure in fluid is the AMETEK, Model No. 1X748, USA, listed in Grainger 1996 Catalogue No. 387, page 835. Value H was measured using the dimensions shown in FIG. 4(1 % ¼" pipe, ¾" diameter orifice through-hole) to be a pressure loss of H=3 psi. According to the Standard Handbook for Mechanical Engineers, Baumeister & Marks, 7th Edition, McGraw & Hill, 1967, page 1–82, a standard conversion for psi to feet of water is 14.5 psi is equivalent to 33.49 feet of water. Converting psi to inches of fluid in the subject invention which is needed for input into equation(1) would be 3 psi×33.49 ft(of water)/14.5 psi=6.9 ft of fluid=82.1 inches of fluid=H. The value H, changes for each of the combined output flow amounts at the sprinkler heads 500 (FIG. 5) of nine(9), twelve(12), fifteen(15), and eighteen(18) gallons per minute. The orifice pressure loss, H, ranges from 2.7 psi to approximately 3.0 psi for these different gall/min flow amounts.

In equation (1) R is the radius of the through-hole opening 41 in the metering cap 40.

Solving equation (1) for a combined output flow at the sprinkler heads 500(FIG. 5) of nine(9), twelve(12), fifteen (15), and eighteen(18) gallons per minute. Yields the following Table I of which the results are shown in the graphs of FIGS. 7A–7D.

TABLE I

| Q Flow Rate, C3 (in³/sec) | Q Flow Rate, C3 (oz/sec.) | 9 Gal/min W4 (C3 + W3) (oz/Gal) | 12 Gal/min W4 (C3 + W3) (oz/Gal) | 15 Gal/min W4 (C3 + W3) (oz/Gal) | 18 Gal/min W4 (C3 + W3) (oz/Gal) | Metering Cap Radius/Dia. inches |
|---|---|---|---|---|---|---|
| 0.5 | 0.0345 | 0.23 | 0.2 | 0.14 | 0.12 | .03" ¹⁄₁₆" |
| 2.0 | 0.138 | 0.92 | 0.7 | 0.6 | 0.5 | .06" ⅛" |
| 4.5 | 0.311 | 2.08 | 1.6 | 1.2 | 1.0 | .09" ³⁄₁₆" |
| 8.0 | 0.552 | 3.7 | 2.8 | 2.2 | 1.8 | .13" ¼" |
| 12.6 | 0.869 | 5.78 | 4.3 | 3.5 | 2.9 | .16" ⁵⁄₁₆" |

FIG. 7B is a graph of the through-hole diameter sizes 41 in the metering cap 40 versus amount of chemicals needed to be mixed for a sprinkler system having a combined output flow at the sprinkler heads 500(FIG. 5) of twelve(12) gallons per minute. FIG. 7C is a graph of the through-hole diameter sizes 41 in the metering cap 40 versus amount of chemicals needed to be mixed for a sprinkler system having a combined output flow at the sprinkler heads 500(FIG. 5) of fifteen(15) gallons per minute. FIG. 7D is a graph of the through-hole diameter sizes 41 in the metering cap 40 versus amount of chemicals needed to be mixed for a sprinkler system having a combined output flow at the sprinkler heads 500(FIG. 5) of eighteen(18) gallons per minute. Using the graphs of FIGS. 7A–7D, a user already knowing the amount of chemicals needed in ounces per gallon(W4), can use the graphs to figure out which metering cap 40(FIG. 6) to use in the dispenser.

Figure 3:
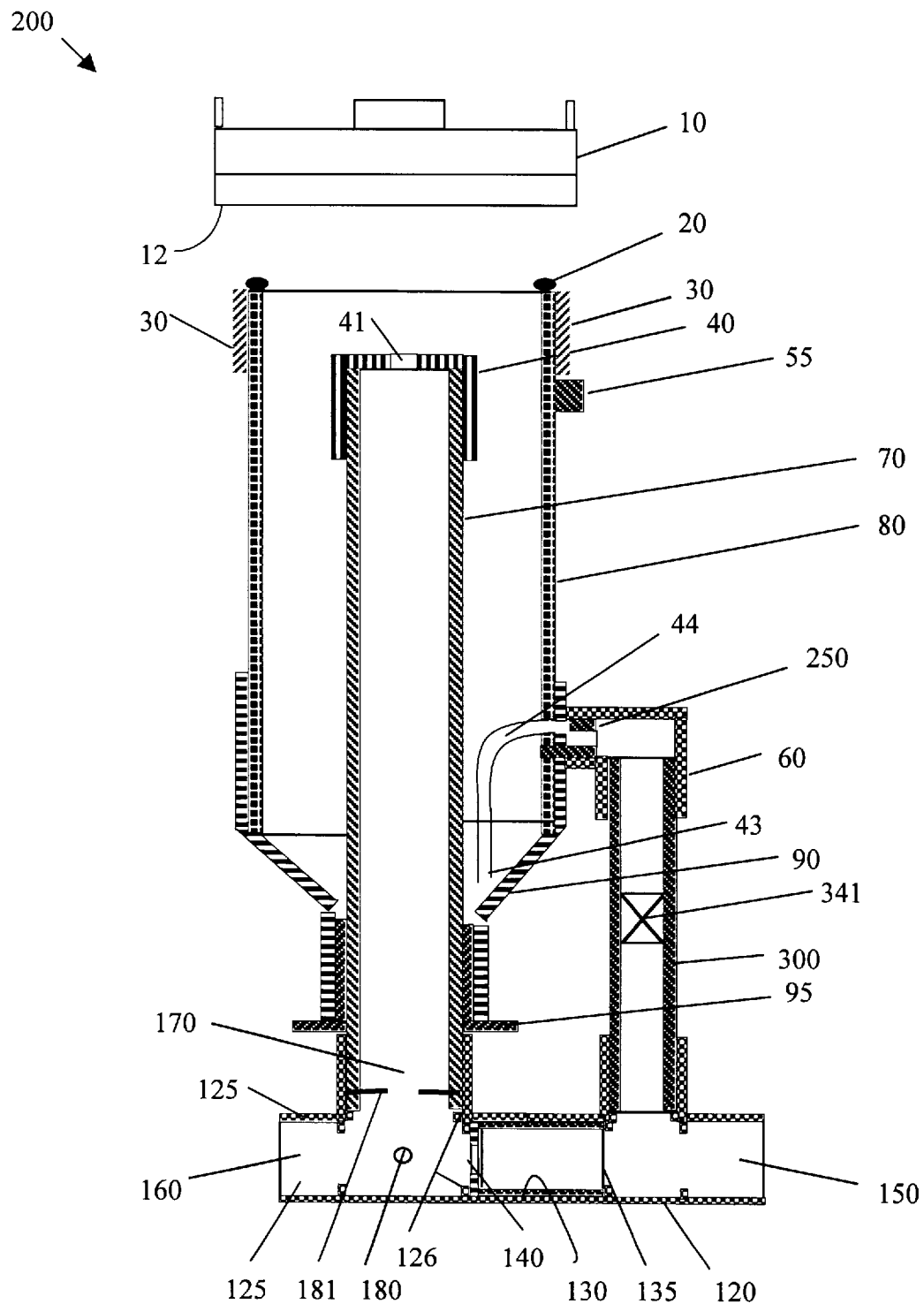
FIG. 3 is a cross-sectional view of a second preferred embodiment of the automatic fertilizer invention.

FIG. 3 is a cross-sectional view of a second preferred embodiment 200 of the automatic fertilizer invention. Embodiment 200 is similar to that of embodiment 1 depicted previously with the exception of having a shorter vertical side pipe 300 having an internal back flow preventer check valve 341 which only allows water flow in the up direction. Pipe 300 attaches to the lower side through-hole 85 of main cylinder body 80 by a nipple 250 which are connected in a similar manner to the corresponding components in the first embodiment.

Although, the embodiments describe using a city water supply for the sprinkler system, the invention can be applied to sprinkler systems which use well water supplies, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An automatic fertilizing apparatus comprising:

an input line for introducing a fluid flow from a fluid flow source;

a first splitter having a first side opening, a top opening, and a second side opening, the first side opening for receiving the fluid flow and separating the fluid flow into a first fluid path through the top opening and into a second fluid path through the second side opening;

a main body housing a chemical liquid, the main body having a first opening in an upper portion of the main body for receiving the chemical liquid therein, a second opening in the upper portion of the main body for receiving the first fluid path and providing an interior fluid flow path to an interior portion of the main body beneath the chemical liquid for raising the chemical liquid, and a bottom opening in the main body;

a metering means within the main body for preselecting the amount of the raised chemical liquid that passes to the bottom opening, the metering means forming a chemical liquid path;

a second splitter having a first side opening, a top opening and a second side opening, the first side opening for receiving the second fluid path, a top opening connected to the bottom opening of the main body for receiving the chemical liquid path, the second side opening connected to an output line;

an obstruction means having a central orifice throughhole, the obstruction means positioned between the first side opening of the second splitter and the second side opening of the first splitter, wherein the obstruction means causes a pressure differential on both sides thereof with a point of lowest pressure within the second splitter, and the metering means controlling the preselected amounts of the chemical liquid being injected into the output line.

2. The automatic fertilizer apparatus of claim 1, wherein the metering means includes:

a removable cap having a variable sized diameter through-hole thereof, the variable sized diameter through-hole being equivalent to the preselected amounts of the chemical liquid to be mixed with the fluid flow.

3. The automatic fertilizer apparatus of claim 2, wherein the metering means further includes:

a pipe having a diameter smaller than the diameter of the main body, the pipe having an upper end with the removable cap located at approximately same height to the first opening of the main body, the pipe having a lower end for feeding into the top opening of the second tee splitter.

4. The automatic fertilizer apparatus of claim 1, wherein the central orifice through-hole in the obstruction means includes:

a bevelled edge facing the point of lowest pressure within the second splitter.

5. The automatic fertilizer apparatus of claim 3, further including:

a focussing means for directing the fluid flow from the the lower end of the pipe to the point of lowest pressure region.

6. The automatic fertilizer apparatus of claim 1, wherein the chemical liquid is chosen from at least one of:

fertilizer, insecticide, and herbicide.

7. The automatic fertilizer apparatus of claim 1, wherein the output line includes:

a sprinkler system.

8. The automatic fertilizer apparatus of claim 1, wherein the fluid flow source includes:

a city water supply.

9. A method of injecting selected amounts of chemicals into a fluid flow path comprising the steps of:

(a) supplying a fluid flow path;

(b) splitting the fluid flow path into a second fluid path and a third fluid path;

(c) metering a chemical into the second fluid path into an interchangeable cap having different through-hole diameters equivalent to preselected amounts of chemicals and passing the chemical by the second fluid path down through a pipe to form a chemical liquid path; and (d) forming a pressure differential between the chemical liquid path and the third fluid path, a region on one side of the differential being the point of lowest pressure corresponding to the preselected amounts of chemicals per an output fluid path.

10. The method of injecting the selected amount of chemicals of claim 9, wherein the output fluid path includes:

a sprinkler system.

11. The method of injecting the selected amount of chemicals of claim 9, wherein the pressure differential forming step(d) includes:

metering the third fluid path to the point of lowest pressure.

12. The method of injecting the selected amount of chemicals of claim 11, further including the step of:

focussing the fluid flow from the pipe to the point of lowest pressure region.

13. The method of injecting the selected amount of chemicals of claim 9, wherein the chemical includes at least one chosen from:

fertilizer, insecticide, and herbicide.

14. An automatic fertilizing apparatus comprising:

means for introducing a fluid flow from a fluid flow source;

a first splitter having a first side opening, a top opening, and a second side opening, the first side opening for receiving the fluid flow and separating the fluid flow into a first fluid path through the top opening and into a second fluid path through the second side opening;

a main body housing a chemical liquid, the main body having a first opening in an upper portion of the main body for receiving the chemical liquid therein, a second opening in the upper portion of the main body for receiving the first fluid path and providing a fluid flow path to an interior portion of the main body beneath the chemical liquid for raising the chemical liquid, and a bottom opening in the main body;

a metering cap attached to a pipe within the main body for preselecting the amount of the raised chemical liquid that passes to the bottom opening, the metering cap having a variable sized diameter through-hole thereof, the variable sized diameter through-hole being equivalent to a preselected amount of the chemical liquid to be mixed with the fluid flow, the metering cap and the pipe forming a chemical liquid path to the bottom opening;

a second splitter having a first side opening, a top opening and a second side opening, the first side opening for receiving the second fluid path, a top opening connected to the bottom opening of the main body for receiving the chemical liquid path, the second side opening connected to an output line;

an obstruction means having a central orifice through-hole, the obstruction means positioned between the first side opening of the second splitter and the second side opening of the first splitter, wherein the obstruction means causes a pressure differential on both sides thereof with a point of lowest pressure within the second splitter, and the metering means controlling the preselected amounts of the chemical liquid being injected into the output line.

* * * * *